Nov. 2, 1965     A. B. BASSOFF     3,214,843
GEAR GAUGING
Filed Dec. 18, 1961     2 Sheets-Sheet 1
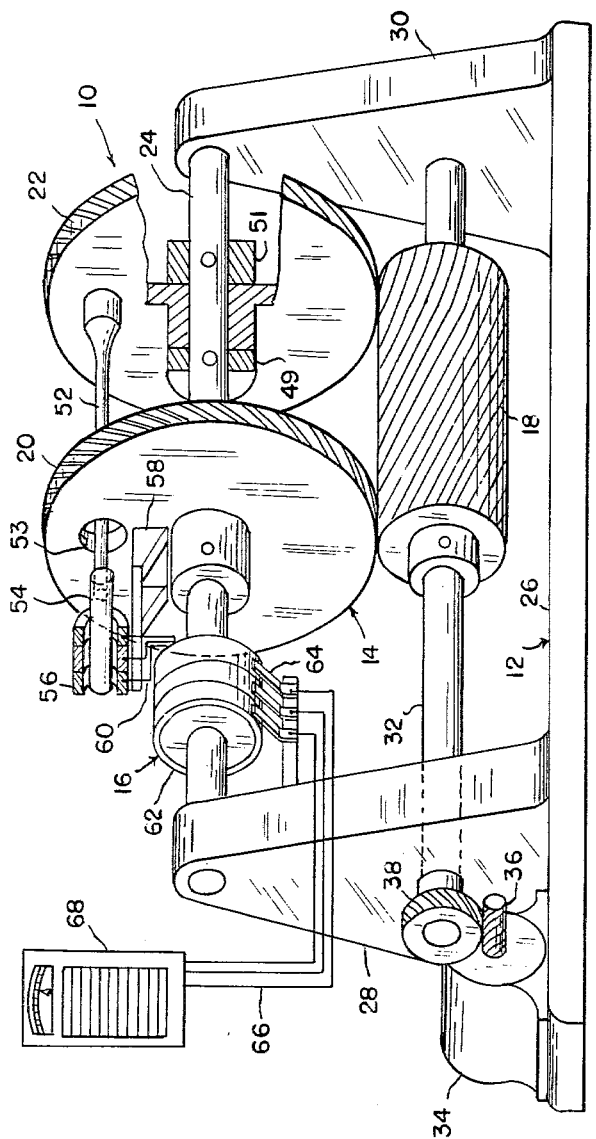
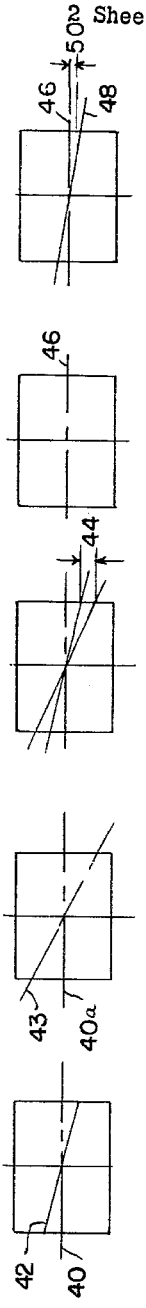
INVENTOR.
ARTHUR B. BASSOFF
BY Whittemore
Hulbert & Belknap
ATTORNEYS

United States Patent Office 3,214,843
Patented Nov. 2, 1965

3,214,843
GEAR GAUGING
Arthur B. Bassoff, Detroit, Mich., assignor to National Broach & Machine Company, Detroit, Mich., a corporation of Michigan
Filed Dec. 18, 1961, Ser. No. 159,858
5 Claims. (Cl. 33—179.5)

The invention relates to gear gauging and refers more particularly to a method of and apparatus for determining the position of gear teeth relative to the position of the teeth of a master gear.

In the manufacture of gears it is desirable to check the position of the teeth thereof to insure proper meshing of finished gears. Specifically it is necessary to inspect helical gears to insure the gears produced have teeth with a predetermined lead relative to the axis of rotation thereof. The teeth of spur gears must be correctly aligned relative to their axis of rotation. Inspection methods and apparatus for checking the lead and alignment of gear teeth have in the past been complicated, expensive, inefficient and sometimes inaccurate.

It is therefore one of the purposes of the present invention to provide improved means for determining the position of gear teeth relative to a desired position thereof.

Another purpose is to provide an improved method for determining the position of gear teeth relative to a desired position thereof.

Another purpose is to provide improved means for determining the position of gear teeth relative to a desired position thereof comprising means for rotating a pair of relatively rotatable master gears in mesh with the gear teeth to be checked and means for measuring the relative rotation between said master gears.

Another purpose is to provide improved means for determining the position of gear teeth relative to a desired position thereof comprising means for rotating a work gear, the position of the teeth of which is to be determined, a master gear assembly including a shaft and a pair of relatively thin master gears mounted for relative rotation on said shaft in axial spaced relation, said shaft being parallel to the axis of said work gear and the teeth of said master gears being in mesh with the teeth of said work gear at opposite ends thereof whereby on rotation of said work gear said master gears are caused to rotate relative to each other an amount depending on the difference in the position of the teeth of said master gears and work gear, and means for measuring and recording the relative rotation of the master gears.

Another purpose is to provide structure as set forth above wherein said measuring and recording means includes means for recording the variations in an electrical signal and means for producing an electrical signal variable in response to relative rotation between said master gears.

Another purpose is to provide structure as set forth above wherein said means for producing a variable electrical signal includes a shaft rigidly secured to one of said master gears and extending toward the other of said master gears, a differential transformer mounted on said other master gear, an armature for said differential transformer attached to said shaft and adapted to move relative to said differential transformer on relative rotation of said gears to provide a variable electrical signal output from said transformer.

Another purpose is to provide an improved method for determining the position of the teeth of a work gear relative to the desired position thereof, comprising the steps of providing a pair of master gears in mesh with the teeth of a work gear at opposite ends thereof, rotating the work gear to cause relative rotation of the master gears, and measuring the relative rotation between the master gears.

Another purpose is to provide a method of and apparatus for determining the position of the teeth of a work gear relative to the desired position thereof which are simple, economical and efficient.

Other objects and features of the invention will become apparent as the description proceeds, especially when taken in conjunction with the accompanying drawings, illustrating a preferred embodiment of the invention, wherein:

FIGURE 1 is a diagrammatic illustration of gear gauging apparatus according to the invention.

FIGURES 2, 2A and 2B are diagrammatic representations of a helical gear illustrating lead error of the gear teeth which may be measured according to the present invention.

FIGURES 3 and 3A are diagrammatic representations of a spur gear illustrating misalignment error of the gear teeth which may be measured according to the invention.

Figure 4:
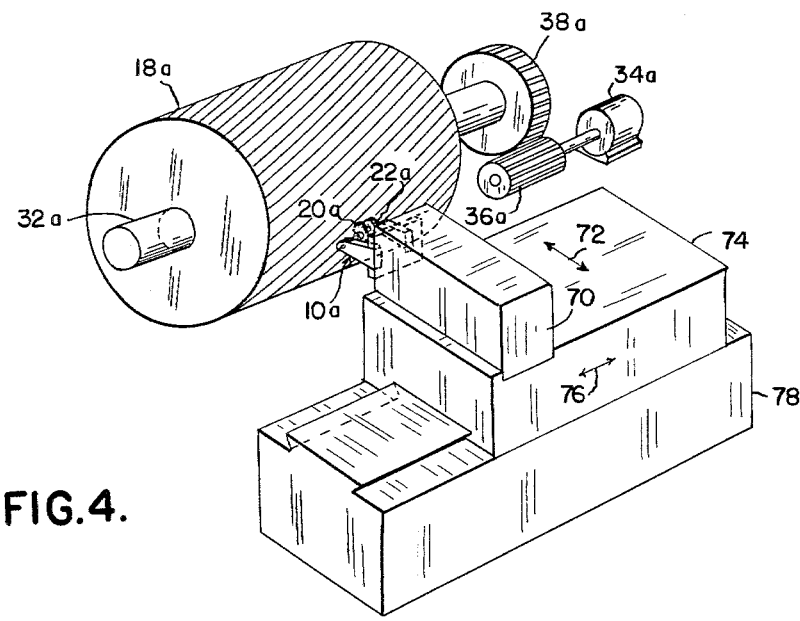
FIGURE 4 is a diagrammatic illustration of gear gauging apparatus according to the invention which is particularly suited to checking the position of the teeth of gears having very wide faces over the entire face of the gears.

With reference to the figures a particular embodiment of the invention will now be described.

The gear gauging apparatus, generally indicated 10 shown in FIGURE 1, comprises frame means generally indicated 12, master gear means generally indicated 14 and error indicator means generally indicated 16.

With the apparatus shown in FIGURE 1 the work gear 18 having teeth, the position of which it is desired to check, is rotated in mesh with the master gears 20 and 22 which are relatively rotatable and in spaced relation on master gear shaft 24. An incorrect lead angle or misalignment error of the teeth of the work gear will cause relative rotation between master gears 20 and 22 as they are rotated in mesh with the work gear. The relative rotation between master gears 20 and 22 as they mesh with different teeth on the work gear 18 as sensed by error indicator means 16 on rotation of the work gear will be proportional to the error in the position of the teeth of the work gear.

FIGURES 2, 2A and 2B indicate diagrammatically helical gears having teeth of the type whose relative position it is desired to determine. As shown diagrammatically in FIGURE 2 the lead of the teeth of a helical gear having correctly positioned teeth with respect to the axis 40 of the gears is indicated by the center line of a tooth of the helical gear 42. FIGURE 2A indicates a helical gear having teeth thereon with an incorrect lead angle as illustrated by the center line 43 with respect to gear axis 40a. FIGURE 2B indicates the lead error 44 of the gear shown in FIGURE 2A with respect to the proper lead angle shown in FIGURE 2 of for example a master gear, such as gears 20 and 22.

In FIGURE 3 the gear axis and center line 46 of a correctly aligned gear tooth of a spur gear is indicated. In FIGURE 3A the center line 48 of the gear tooth is shown to be misaligned with respect to the gear axis 46. As will be understood the misalignment error of the teeth of the spur gear is then shown at 50.

According to the invention a method is provided for determining the lead error and misalignment error of the helical and spur gears as indicated. Also, apparatus is provided for accomplishing the method of the invention.

More specifically frame means 12 includes base 26 having mounted thereon supports 28 and 30 in which a work arbor 32 and master gear shaft 24 are journaled for rotation. Motor 34 having worm 36 attached to its output shaft is positioned on base 26 as shown in driving relation to the work arbor 32 through the driven worm gear 38 as illustrated. Thus, the work gear 18 mounted on arbor 32 may be rotated. Master gear shaft 24 is freely rotatable in frame members 28 and 30.

Master gear means 14 comprises the master gear shaft 24 previously discussed, master gear 20 rigidly secured to shaft 24 for rotation therewith and master gear 22 mounted for free rotation on shaft 24 by means of collars 49 and 51 which restrain axial movement of master gear 22. On meshing of a work gear 18 with the gears 20 and 22 and during rotation thereof in mesh, gears 20 and 22 are caused to rotate relative to each other due to any misalignment or lead error of the work gear 18.

The recording means 16 includes the shaft 52 rigidly secured to the master gear 22 for rotation therewith, passing through opening 53 in master gear 20, and having mounted on the end thereof and at right angles thereto a differential armature 54. The position of the differential armature 54 with respect to the differential transformer 56 will thus be changed on relative rotation between master gears 20 and 22 due to the mounting of the differential transformer 56 on master gear 20 on bracket 58. The electrical signal developed by differential transformer 56 which will vary with the position of the armature 54 with respect thereto is passed through conductors 60 to slip rings 62 mounted for rotation with shaft 24, to brushes 64, and thence through conductors 66 to indicator 68.

It will be understood other electronic or photoelectric means for developing an electrical signal proportional to relative rotation between a pair of axially aligned discs may be substituted for the differential transformer 56 and movable armature 54. Also it will be understood that the indicator 68 may be either a visual instantaneous indicator or a permanent recorder or both as desired. Furthermore other physical arrangements of the apparatus disclosed are contemplated.

In operation it is desired for example to determine the lead or helix angle error of a helical work gear 18. The work gear 18 is positioned on arbor 32. The very thin master gears 20 and 22 having the desired helical teeth thereon are positioned in mesh with axially spaced portions of the helical work gear 18 as shown in FIGURE 1 with the teeth thereon in engagement with the teeth on the work gear. Meshing of the teeth of the master gears with the teeth of the work gear will cause an initial relative rotation between the master gears to a relative position dependent on the lead or helix angle of the work gear teeth and the axial spacing of the master gears. If the teeth of the gear in mesh with the master gear are of correct helix angle the differential transformer will have been calibrated to have a minimum or other desired output. If a helix error exists, the output will be correspondingly varied. Opening 53 in conjunction with shaft 52 prevents an initial relative rotation of master gears 20 and 22 which is equal to the spacing of the teeth of the master gears.

The work gear 18 is then rotated by means of motor 34 causing rotation of the master gears 20 and 22. As previously indicated any variations in lead error of the helical teeth of the work gear 18 will cause relative rotation of the master gears 20 and 22 during rotation of the work gear 18. On relative rotation of the master gears the armature 54 will therefore be caused to move relative to the transformer 56 whereby a varying electrical signal will be produced in the differential transformer. The varying electric signal is fed through conductors 60, slip rings 62, brushes 64 and conductors 66 to the indicator 68 where it may in the known manner give an instantaneous or permanent record of the relative lead of the teeth of the master gears and the teeth of the work gear over the entire three hundred sixty degrees circumference of the work gear on rotation thereof.

Thus applicant has provided a method by which the position or helix angle of the teeth of a work gear relative to a master gear may be determined over the entire circumference thereof during a three hundred sixty degree rotation of the work gear, comprising the steps of rotating the work gear in mesh with a pair of master gears located at each end of the work gear to cause relative rotation between the master gears proportional to lead errors of the teeth of the work gear with respect to the teeth of the master gears, measuring the relative rotation between the master gears and indicating said measurement. Furthermore applicant has provided apparatus as described above by which this method may be carried out.

The gear gauging apparatus disclosed may be operated with the work gear and master gears in tight mesh, or with backlash in which case the driven members (master gears as shown herein) will be lightly braked and both sides of all teeth will be checked by rotation of the gears in both directions. The braking action may result from friction in the mounting of shaft 12, and friction between gear 22 and collars 49 and 51.

FIGURE 4 illustrates a particular installation of a gear gauge 10a similar to that disclosed above which is particularly useful in checking the alignment and similar errors of the teeth of a wide face work gear 18a, such as may be used in heavy machinery, ship propulsion drives, and the like. As illustrated in FIGURE 4 the wide face work gear 18a is mounted for rotation on shaft 32a by convenient means, such as gear 38a and pinion 36a driven by motor 34a. Gear gauging apparatus 10a similar to that disclosed above with the deletion therefrom of work gear 18, shaft 32 and drive means therefor is positioned on side 70 which is adapted to move in the direction of arrows 72 on saddle 74 to engage or disengage master gears 20a and 22a with work gear 18a. Saddle means 74 as shown is mounted for movement in direction of arrows 76 on table 78 to position the master gears 20a and 22a axially with respect to the work gear 18a. Convenient means for driving both slide 70 and saddle 74 which are not shown and which are well known in the art must of course be provided.

In operation of the apparatus shown in FIGURE 4 the gear gauging apparatus 10a is moved toward the wide face gear 18a until master gears 20a and 22a mesh with the teeth of gear 18a at axial spaced locations thereon. The gear 18a may then be rotated and the alignment and similar errors of the gear teeth between the axially spaced locations at which the master gears are engaged may be recorded as before. Slide 70 is then caused to move to disengage the master gears 20a and 22a from the work gear 18a and the saddle is then moved axially with respect to the work gear 18a. Subsequently slide 70 may be again moved to engage the master gears 20a and 22a with the work gear 18a at different axially spaced locations thereon. The work gear may again be rotated and the entire procedure repeated a plurality of times to check the teeth of the wide face work gear over the entire face thereof. Thus it will be seen that the gear gauging apparatus 10a as disclosed above is particularly advantageous in checking the alignment and other errors of the teeth of wide face cylindrical gears over the entire face thereof.

The drawings and the foregoing specification constitute a description of the improved gear gauging method and apparatus in such full, clear, concise and exact terms as to enable any person skilled in the art to practice the invention, the scope of which is indicated by the appended claims.

What I claim as my invention is:

1. Structure for checking the lead of gear teeth of a wide face cylindrical work gear from end to end thereof, comprising means supporting the work gear for rotation, a pair of axially aligned, axially spaced apart master gears, means mounting the master gears for rotation together and for relative rotation and for movement axially of the work gear and radially thereof into and out of mesh with the work gear, means for maintaining the teeth of the master gears in continuous contact with the same sides of teeth of the work gear, means for rotating all of said gears in meshed relation, and measuring means responsive to the relative rotation of the master gears when rotated in mesh with the work gear.

2. Structure as defined in claim 1 in which the means mounting the master gears for movement radially of the work gear provides for tight mesh engagement between the work gear and both of the master gears.

3. Structure as defined in claim 1 in which the means mounting the master gears for movement radially of the work gear provides for loose meshing engagement between the work gear and both of the master gears, and brake means opposing rotation of one of said gears effective to maintain the teeth of said master gears in contact with the same sides of the teeth of the work gear.

4. Structure as defined in claim 1 in which the means mounting the master gears for movement radially of the work gear provides for loose meshing engagement between the work gear and both of the master gears, brake means opposing rotation of one of said gears effective to maintain the teeth of said master gears in contact with the same sides of the teeth of the work gear, and in which the means for rotating the gears comprises drive means connected directly to the work gear.

5. A method for determining the accuracy of the helix angle of the teeth of a wide face cylindrical work gear over the entire face of the cylindrical gear, comprising the steps of rotating the cylindrical gear in mesh with a pair of axially spaced apart relatively rotatable master gears, measuring the relative rotation between the master gears, disengaging the master gears from the cylindrical gear, moving the master gears axially with respect to the cylindrical gear, reengaging said master gears with the cylindrical gear and repeating said steps until the master gears have engaged said cylindrical gear from end to end.

References Cited by the Examiner

UNITED STATES PATENTS

| 2,202,638 | 5/40 | Praeg | 33—179.56 |
| 2,959,282 | 11/60 | Pomernacki | 33—179.52 |

FOREIGN PATENTS 601,612  8/34  Germany.

OTHER REFERENCES

United States patent application No. 148,218 filed October 27, 1961.

ISAAC LISANN, *Primary Examiner.*